United States Patent
Maemura et al.

(10) Patent No.: US 8,469,301 B2
(45) Date of Patent: Jun. 25, 2013

(54) SEAT BELT RETRACTOR

(75) Inventors: Eiji Maemura, Yokohama (JP); Hiroko Yoshikawa, Yokohama (JP); Junichi Nagatomo, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/508,119

(22) PCT Filed: Nov. 4, 2010

(86) PCT No.: PCT/JP2010/069635
§ 371 (c)(1),
(2), (4) Date: May 4, 2012

(87) PCT Pub. No.: WO2011/055763
PCT Pub. Date: May 12, 2011

(65) Prior Publication Data
US 2012/0211579 A1    Aug. 23, 2012

(30) Foreign Application Priority Data
Nov. 4, 2009   (JP) ................................ 2009-253121

(51) Int. Cl.
   *B65H 75/48*   (2006.01)
(52) U.S. Cl.
   USPC ......................................................... 242/374
(58) Field of Classification Search
   USPC ............................ 242/372–375, 375.1–375.2
   See application file for complete search history.

(56) References Cited

U.S. PATENT DOCUMENTS

| 6,857,594 | B2 * | 2/2005 | Mori et al. | 242/374 |
| 7,533,842 | B2 * | 5/2009 | Saito et al. | 242/390.9 |
| 7,934,673 | B2 * | 5/2011 | Saito et al. | 242/374 |
| 8,070,086 | B2 * | 12/2011 | Umakoshi et al. | 242/374 |
| 8,240,591 | B2 * | 8/2012 | Aihara et al. | 242/374 |

FOREIGN PATENT DOCUMENTS

| JP | 2002-326558 | 11/2002 |
| WO | WO 2008/149746 | 12/2008 |

OTHER PUBLICATIONS

International Search Report of PCT/JP2010/069635 Mailed Dec. 7, 2010 (2 pages).

* cited by examiner

*Primary Examiner* — Sang Kim
(74) *Attorney, Agent, or Firm* — Brinks Hofer Gilson & Lione (57) ABSTRACT

A clutch includes a clutch housing that rotates with a spindle and has inner teeth; a pair of pawls that can engage with the inner teeth; a gear wheel that is joined to a motor and has a pair of sliding grooves that hold the pawls such that the pawls can move in the sliding grooves between a first position when the motor is not operating, a second position at which the pawls engage with the inner teeth of the clutch housing through operation of the motor, and a third position at which the pawls become positioned on the opposite side to that of the second position across the first position upon operation of the pre-tensioner; and a return prevention mechanism that prevents the pawls from returning to the first position and the second position after having moved to the third position.

7 Claims, 8 Drawing Sheets

FIG. 8

SEAT BELT RETRACTOR

BACKGROUND

1. Field of the Invention

The present invention relates to a seat belt retractor, and more particularly to a seat belt retractor that is provided with an electric actuator and a pyrotechnic pretensioner.

2. Related Technology

In conventional seat belt retractors, a spindle is caused to rotate in a winding direction, by a motor, when a sensor detects a sudden deceleration state of a vehicle. In a case where a collision is possible, the seat belt (webbing) is wound by a predetermined amount, to restrain lightly thereby an occupant, and during a collision, the pyrotechnic pretensioner is operated, the seat belt is wound forcibly, and the occupant is held reliably. (See, for instance, Japanese Patent Application Publication No. 2002-326558, discussed below.)

Upon operation of a pyrotechnic pretensioner in the seat belt retractor disclosed in Japanese Patent Application Publication No. 2002-326558, engagement between a final gear and a pawl is released through reverse rotation of a motor in a power transmission mechanism that transmits power from an electric actuator to a spindle; power transmission from the motor to the spindle is thus broken off, and the spindle is prevented from receiving the load of the motor upon winding of the seat belt by the pretensioner.

In another seat belt retractor, engagement between a final gear and a pawl is released through reverse rotation of a motor upon operation of a pyrotechnic pretensioner. In such a configuration, where the engagement between a pawl and a final gear is released by a motor, an accurate disengagement operation may fail to take place accompanying a sudden collision or the like. Also, some time may elapse from start-up of the motor until the release operation is performed. Moreover, no consideration has been given to the attitude of the pawl after release.

SUMMARY OF THE INVENTION

In the light of the above conventional problems, it is an object of the present invention to provide a seat belt retractor which, with few parts, enables reliable clutch operation also upon operation of a pyrotechnic pretensioner.

The above object of the present invention is attained by way of the features set forth below.

In one aspect of the present invention, the seat belt retractor includes a spindle that winds a seat belt; an electric actuator that generates power for causing the spindle to rotate; a pyrotechnic pretensioner that retracts the seat belt by acting on the spindle; a power transmission mechanism that is capable of transmitting power from the electric actuator to the spindle and that is capable of blocking power transmission from the electric actuator to the spindle upon operation of the pretensioner; wherein the power transmission mechanism includes: a first rotation member that rotates together with the spindle and has an engaged section; an engaging member having an engaging section that can engage with the engaged section of the first rotation member; and a second rotation member that is joined to the electric actuator and has a groove section that holds the engaging member, such that the engaging member can move in the groove section to a first position at which the engaging member is positioned when the electric actuator is not operating, a second position at which the engaging member becomes positioned when the engaging section engages with the engaged section of the first rotation member through operation of the electric actuator, and a third position at which the engaging member becomes positioned on an opposite side to that of the second position across the first position upon operation of the pretensioner; and a return prevention mechanism that prevents the engaging member from returning to the first position and the second position after having moved to the third position, and wherein the return prevention mechanism comprises an annular spring member that, on account of a biasing force thereof, is held against a non-driven portion of a case member and against a recess that is provided in the engaging member; and a projection that is provided in the second rotation member, such that the spring member climbs over the projection and moves when the engaging member moves from the second position to the third position across the first position through operation of the pretensioner.

In another aspect of the invention, the seat belt retractor has a spring member with at least two or more bent sections that are formed projecting in a radial direction, a first bent section from among the two or more bent sections is held in the recess that is formed in the engaging member, and a second bent section from among the two or more bent sections climbs over the projection that is provided in the second rotation member when the engaging member moves from the second position to the third position across the first position.

According to another aspect of the invention, the projection is provided at an end face of the second rotation member to which the spring member is adjoining, and projects from the end face towards the spring member.

In a further aspect of the invention, the projection is provided at an outer edge section of the second rotation member and projects from the outer edge section towards an inner diameter side.

In yet another aspect of the invention, the second bent section is formed so as to project in the radial direction and project thereafter in an axial direction, the second rotation member is provided with a trough-hole or a recess that permits the second bent section to move accompanying the motion of the engaging member, and the projection is provided on an inner peripheral face of the trough-hole or the recess, and projects from the inner peripheral face towards an outer diameter side.

The seat belt retractor of the present invention enables reliable clutch operation, achieved with few parts, such that after operation of a pretensioner, an engaging section of an engaging member does not engage again with an engaged section of a first rotation member.

DETAILED DESCRIPTION

A seat belt retractor according to various embodiments of the present invention will be explained next in detail with reference to accompanying drawings.

Figure 1:
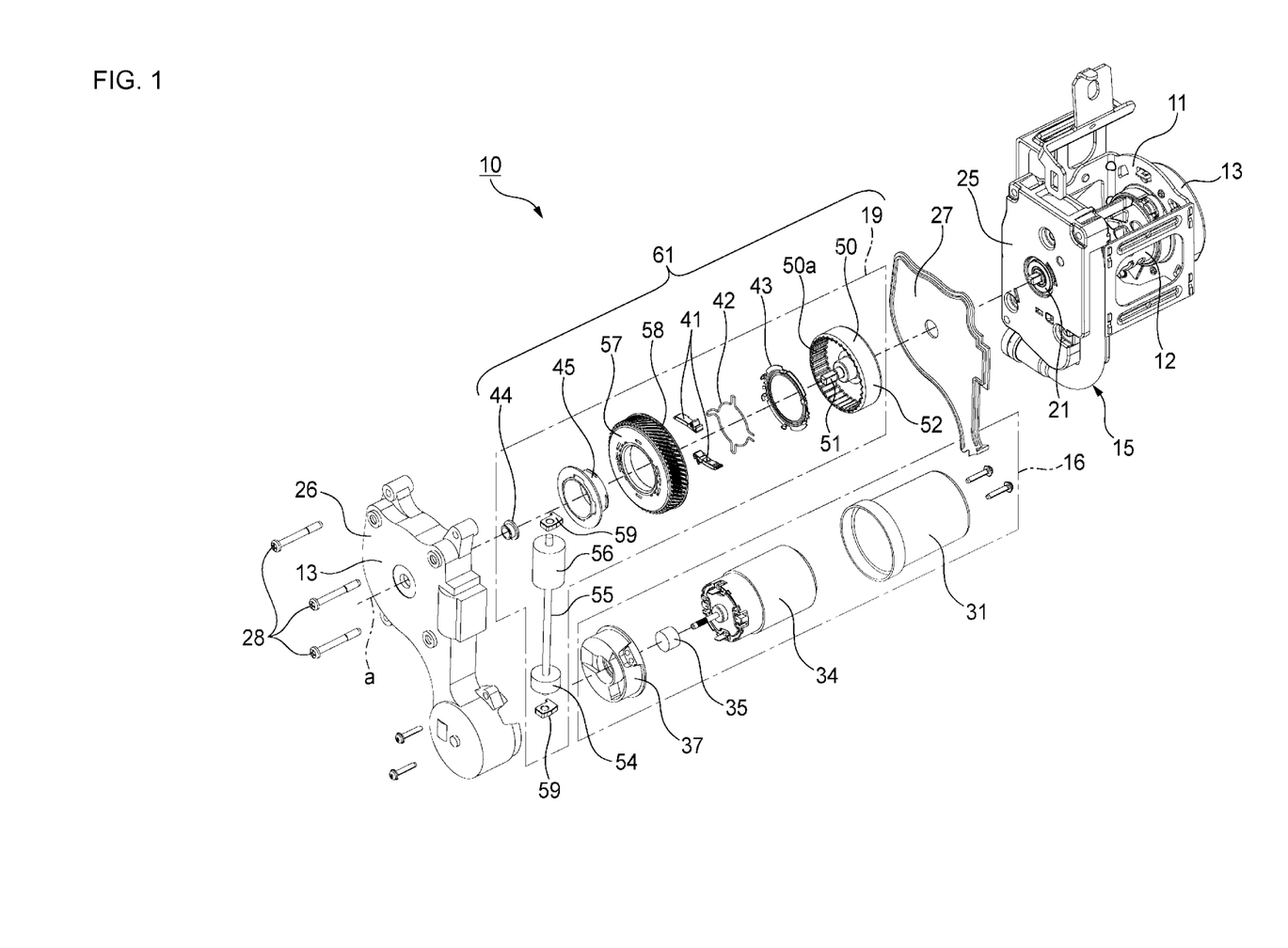
FIG. 1 is an exploded perspective-view illustrating a portion of a seat belt retractor according to the present invention.

As illustrated in FIG. 1, a seat belt retractor 10 according to a first embodiment comprises: a spindle 12 that winds a seat belt (not shown); a winding spring device 13 that biases the spindle 12 in the winding direction of the seat belt; a lock mechanism (not shown) that locks the pull-out operation of the seat belt in response to acceleration that is detected by an acceleration sensor (not shown); a motor 34 being an electric actuator that generates power for causing the spindle 12 to rotate; a pretensioner 15 that generates other power for causing the spindle 12 to rotate; and a power transmission mechanism 19 that enables power from the motor 34 to be transmitted to the spindle 12.

The spindle 12 is rotatably supported, on both ends, by a retractor frame 11. Within the spindle 12 there is provided a torsion bar (not shown), which constitutes an energy absorption mechanism, having one end (right end side in FIG. 1) connected to the spindle 12, and having the other end side (left end side in FIG. 1) connected to a tread head 21 to which a force from the pretensioner 15 is inputted.

Through the action of a gas generated by ignition of an explosive, the pretensioner 15 pushes a ball (not shown) out powerfully, and the ball moves along a groove of a pinion (not shown). Rotation of the pinion is transmitted to the tread head 21, the torsion bar and the spindle 12 via the lock mechanism.

On the left side face of the retractor frame 11 in the figure, a tube cover 25 that accommodates the pretensioner 15, and an outer gear cover 26 that is a case member, are mounted, with an inner gear cover 27 in between, to the retractor frame 11, by way of screws 28. Between the inner gear cover 27 and the outer gear cover 26 there is formed a space that accommodates the power transmission mechanism 19 that comprises a clutch 61.

A motor assembly 16 that is positioned below the tube cover 25, i.e. below the retractor frame 11, comprises a motor case 31, the motor 34, a cap 37 and a first gear 35. The first gear 35 is mounted to a rotating shaft of the motor 34, and meshes with a second gear 54 of the power transmission mechanism 19.

Figure 2:
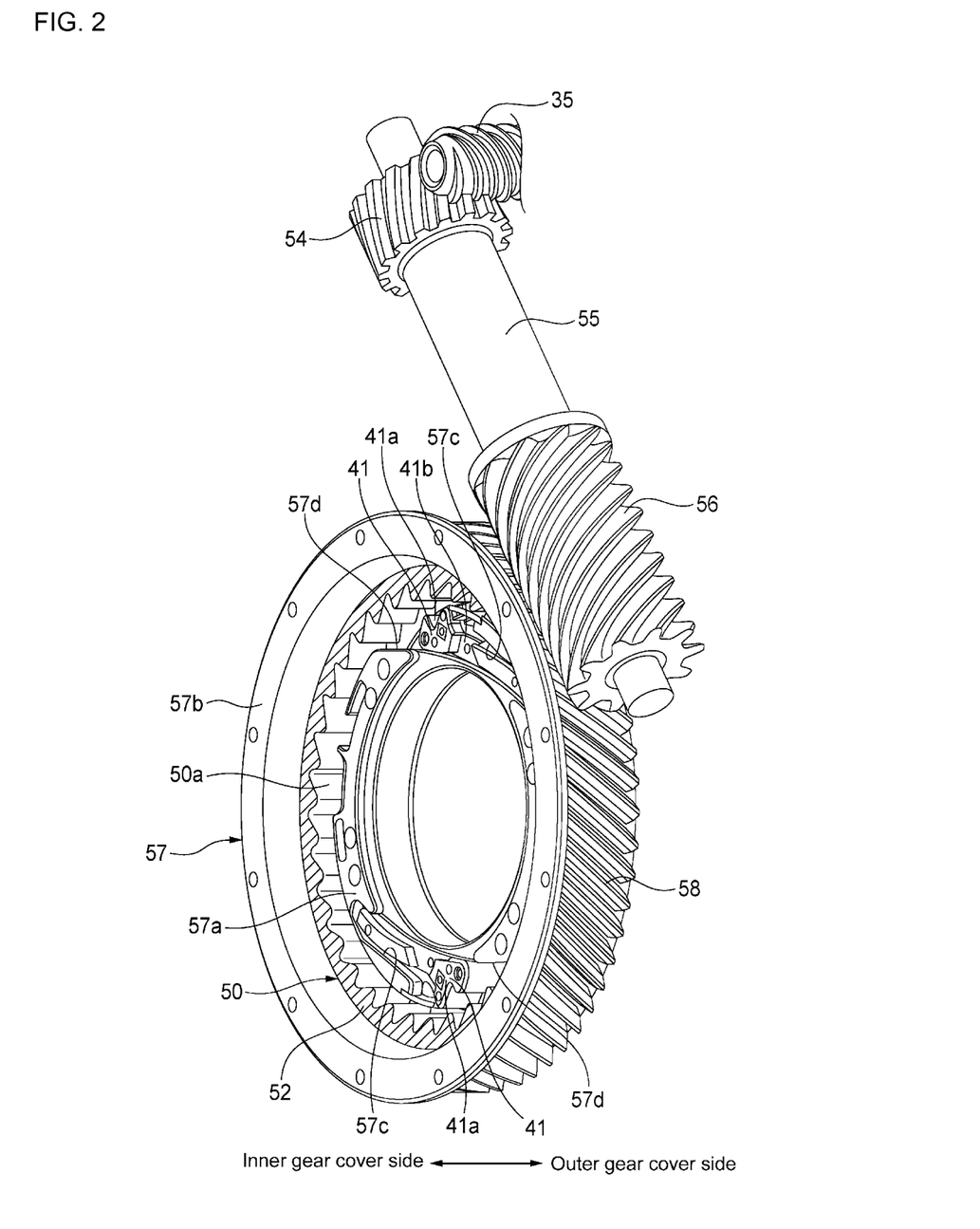
FIG. 2 is a perspective-view illustrating an assembled state of a gear wheel and clutch housing, with part of the clutch housing cut out.

In the power transmission mechanism 19, as illustrated in FIG. 2, the second gear 54 that meshes with the first gear 35 is mounted to one end of a support shaft 55, and a third gear 56 is mounted to the other end, such that the third gear 56 meshes with a final gear 58 that is formed on the outer peripheral face of a gear wheel 57 being a second rotation member that makes up the clutch 61. The support shaft 55 is rotatably supported, on the outer gear cover 26, by a bearing 59. In the present embodiment, the first gear 35, the second gear 54, the third gear 56 and the final gear 58 make up a gear assembly.

As illustrated in FIG. 1 and FIG. 2, the clutch 61 is made up of the gear wheel 57 having the final gear 58 formed on the outer peripheral face thereof, a pair of pawls 41 being engaging members, a friction spring 42 being a spring member, a cover ring 43, a bush 44, a bearing bush 45 and a clutch housing 50 being a first rotation member.

A joining section 51 for joining to the spindle 12 is rotatably supported on the outer gear cover 26 via the bush 44; as a result, the clutch housing 50 rotates integrally with the spindle 12. A cylindrical section 52, in which there are formed inner teeth 50a that are an engaged section with which the pawls 41 engage, is provided on the outer diameter side of the joining section 51. The joining section 51 and the cylindrical section 52 are joined to each other on the inner gear cover 27 side.

The gear wheel 57 has, on the outer peripheral face, a large-diameter side cylindrical section 57b in which the final gear 58 is formed, and a small-diameter side cylindrical section 57a the axial direction length whereof is shorter than that of the large-diameter side cylindrical section 57b. The small-diameter side cylindrical section 57a and the large-diameter side cylindrical section 57b are joined to each other on the outer gear cover 26 side. Power from the motor 34 is transmitted through meshing of the final gear 58 of the large-diameter side cylindrical section 57b with the third gear 56. The cylindrical section 52 of the clutch housing 50 is inserted, from the inner gear cover 27 side, between the small-diameter side cylindrical section 57a and the large-diameter side cylindrical section 57b, and the clutch housing 50 is accommodated within the gear wheel 57. The inner peripheral face of the large-diameter side cylindrical section 57b opposes the outer peripheral face of the cylindrical section 52 of the clutch housing 50 in such a manner that the inner peripheral face of the large-diameter side cylindrical section 57b can rotate relatively with respect to the outer peripheral face of the cylindrical section 52 of the clutch housing 50. The outer peripheral face of the small-diameter side cylindrical section 57a opposes the inner teeth 50a that are formed on the inner peripheral face of the clutch housing 50, in such a manner that the outer peripheral face of the small-diameter side cylindrical section 57a can rotate relatively with respect to the inner teeth 50a. The inner peripheral face of the small-diameter side cylindrical section 57a is rotatably supported, via the bearing bush 45, on a protrusion 26a that is a non-driven portion of the outer gear cover 26. The protrusion 26a projects in the form of a ring, along the axial direction, from the outer gear cover 26, and is formed to be concentrical with the clutch housing 50.

A pair of pawl sliding grooves 57c being groove sections that hold the pair of pawls 41 is formed on the end face of the small-diameter side cylindrical section 57a of the gear wheel 57, on the inner gear cover 27 side. At an opposite position of the outer peripheral face of the small-diameter side cylindrical section 57a (portion rotated by 180°, each pawl sliding groove 57c in the pair thereof has an opening 57d opened in such a manner that an engaging section 41a of each pawl 41 faces the inner teeth 50a of the clutch housing 50. The engaging sections 41a extend in opposing directions to each other, from the openings 57d, according to the shape of the pawls 41.

The pawls in the pair of pawls 41 have respective engaging sections 41a at one end side, and take on a curved shape that curves slightly from one end side to the other end side, such that the pair of pawls 41 is slidably held on the pawl sliding grooves 57c. In the pawl sliding grooves 57c, the pair of pawls 41 moves to a first position P1 (FIG. 3) at which the pair of pawls 41 is positioned when the motor 34 is not operating, a second position P2 (FIG. 4) at which the pair of pawls 41 becomes positioned upon engagement of the engaging sections 41a with the inner teeth 50a of the clutch housing 50, through operation of the motor 34, and a third position P3 (FIG. 6) at which the pair of pawls 41 becomes positioned on the opposite side to that of the second position P2 across the first position P1 upon operation of the pretensioner 15. The pawls 41 are provided with respective holding recesses 41b each of which is a recess that holds a below-described first bent section 42b of the friction spring 42, at substantially the central portion of the end face on the inner gear cover 27 side. In order to hold the below-described first bent sections 42b of the friction spring 42 on each holding recess 41b, the end faces of the pawls 41 on the inner gear cover 27 side are positioned further towards the inner gear cover 27 side than the end face of the small-diameter side cylindrical section 57a of the gear wheel 57, on the inner gear cover 27 side.

The friction spring 42 is substantially ring-shaped and has an open section 42a at which both ends of the friction spring 42 are open. On the outer peripheral face of the protrusion 26a, which is a non-driven portion that is formed on the outer gear cover 26, the friction spring 42 is held against the protrusion 26a while abutting the latter, in the rotating shaft center direction of the spindle 12, on account of the biasing force of the own friction spring 42. The friction spring 42 is covered by the cover ring 43, from the inner gear cover 27 side. In the friction spring 42 there are formed three bent sections at intervals of 90° in such a way so as to project from the open section 42a, towards the outer diameter side. The pair of first bent sections 42b, which are positioned at opposite sides to each other in the peripheral direction, with the open section 42a standing in the center, are held in respective holding recesses 41b of the pawls 41. As a result, when the friction spring 42 is acted upon by a force in the rotation direction, a frictional force in the opposite direction to the rotation direction arises between the friction spring 42 and the protrusion 26a of the outer gear cover 26. A second bent section 42c is formed so as to oppose the open section 42a.

A projection 57e is formed on the end face of the gear wheel 57, on the inner gear cover 27 side, in the vicinity of the second bent section 42c. On the side against which the second bent section 42c abuts, the projection 57e forms a gentle inclined face 76 such that the second bent section 42c can climb over the projection 57e upon operation of the pretensioner 15; on the side opposite to the side against which the second bent section 42c abuts, the projection 57e forms a vertical face 77 that is perpendicular to the end face on the inner gear cover 27 side, in such a manner that the second bent section 42c cannot return after having once climbed over the projection 57e. The second bent section 42c of the friction spring 42 and the projection 57e of the gear wheel 57 constitute the return prevention mechanism of the present invention.

Figure 3:
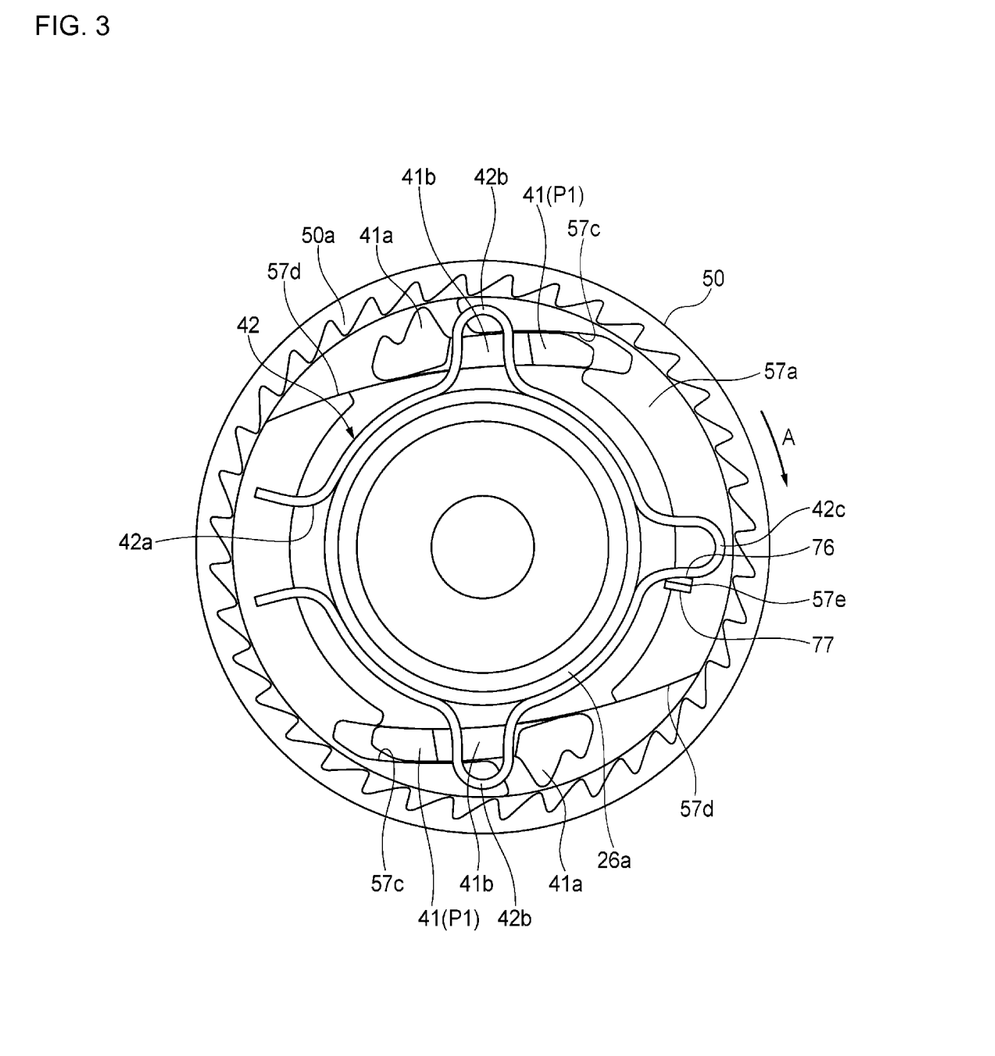
FIG. 3 is a diagram illustrating a non-engaged state of a clutch, in a state where a motor not operating.
Figure 4:
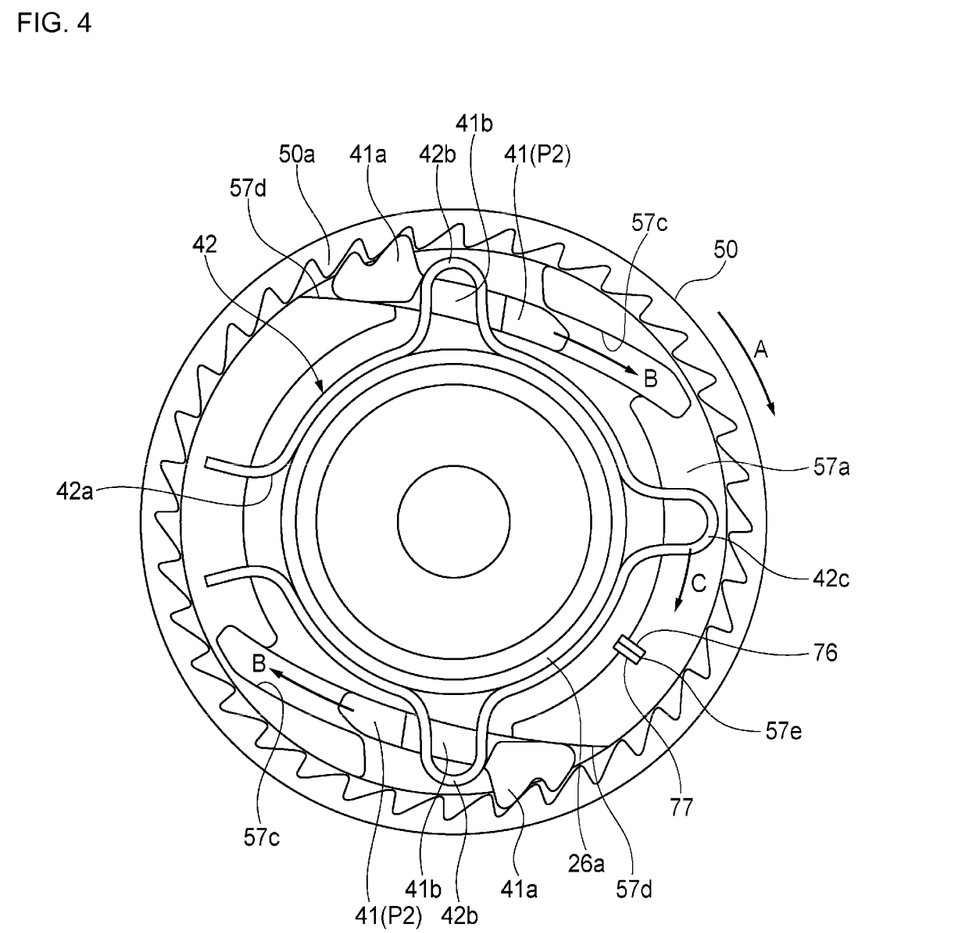
FIG. 4 is a diagram illustrating an engaged state of a clutch that transmits power from a motor.
Figure 6:
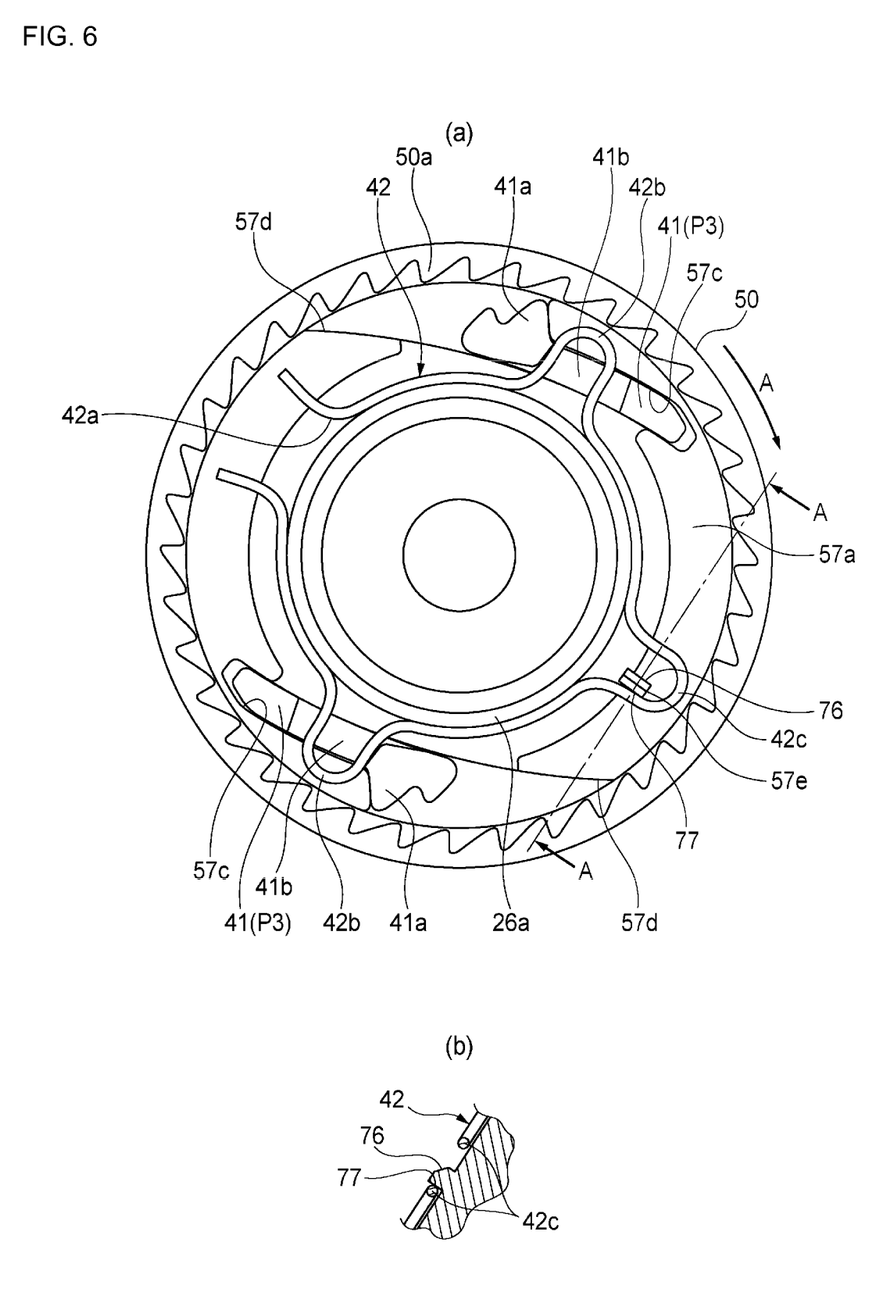
FIG. 6(a) is a diagram illustrating a state in which, from the state of FIG. 5, a bent section of a friction spring climbs over a projection.
FIG. 6(b) is a cross-sectional view generally along line A-A in FIG. 6(a)

In the power transmission mechanism 19 and return prevention mechanism configured as described above, the second bent section 42c abuts the projection 57e when the motor 34 is not operating, i.e. when the pawls 41 are positioned at the first position P1 (FIG. 3). The second bent section 42c moves away from the projection 57e when, through operation of the motor 34, the engaging sections 41a engage with the inner teeth 50a of the clutch housing 50, i.e. when the pawls 41 become positioned at the second position P2 (FIG. 4). The second bent section 42c climbs over the projection 57e upon operation of the pretensioner 15, i.e. when the pawls 41 become positioned at the third position P3 (FIG. 6).

Thus, once the second bent section 42c climbs over the projection 57e and moves to the third position P3, the second bent section 42c is prevented thereafter, by the projection 57e, from returning to the first position P1 and the second position P2.

The operation of the seat belt retractor 10 of the present embodiment is explained next. Upon detection of a possible collision, by a monitoring sensor or the like, not shown, an ECU, not shown, drives the motor 34, before collision, and causes the spindle 12 to rotate, by way of the power transmission mechanism 19, to wind the seat belt up thereby. If there is no longer a change of collision, the motor 34 reverses, and a state is reverted to in which the seat belt can be pulled out. During a collision, on the other hand, the pretensioner 15 operates, as a result of which the clutch 61 is mechanically released, and the seat belt is forcibly wound up.

The operation of the clutch 61 is explained next with reference to FIG. 3 to FIG. 5.

When no winding by the motor 34 is taking place, as illustrated in FIG. 3, the pawls 41 are positioned at substantially the central portion of the pawl sliding grooves 57c, the engaging sections 41a of the pawls 41 are positioned further on the inner diameter side than the inner teeth 50a of the clutch housing 50, and the clutch housing 50 and the pawls 41 are in non-engagement (first position P1). As a result, there is allowed rotation only of the clutch housing 50 integrally with the spindle 12, and the seat belt can be wound up and pulled out normally.

When the motor 34 rotates in the winding direction, the driving force transmitted to the second gear 54 by the first gear 35 that is mounted to the rotating shaft of the motor 34 is transmitted from the third gear 56 to the final gear 58, and the gear wheel 57 rotates clockwise (arrow A). The pawls 41 that hold the first bent sections 42b of the friction spring 42 in the holding recesses 41b are biased herein so as to remain in place by the frictional force between the protrusion 26a of the outer gear cover 26 and the friction spring 42.

Therefore, the pawls 41 move relatively, in the pawl sliding grooves 57c, from substantially the central portion towards the openings 57d.

Upon rotation of the gear wheel 57 by a predetermined angle, as illustrated in FIG. 4, the engaging sections 41a of the pawls 41 move beyond the openings 57d, and engagement with the inner teeth 50a of the clutch housing 50 is completed (second position P2).

When the gear wheel 57 further rotates beyond a predetermined angle in the seat belt winding direction (arrow A), the gear wheel 57, the clutch housing 50, the friction spring 42 and the pawls 41 rotate integrally in the winding direction (arrow A), in a state where the engaging sections 41a of the pawls 41 and the inner teeth 50a of the gear wheel 57 are engaged, and power from the electric actuator is transmitted as a result to the spindle 12.

If the motor 34 rotates in a release direction, the gear wheel 57 rotates counterclockwise (opposite direction to that of arrow A). Herein, the pawls 41 tend to remain in place on account of the frictional force between the protrusion 26a of the outer gear cover 26 and the friction spring 42. As a result, the pawls 41 move relatively from the openings 57d towards the far side, in the pawl sliding grooves 57c, accompanying the rotation of the gear wheel 57, and the engaging sections 41a of the pawls 41 move away from the inner teeth 50a of the clutch housing 50, to return to the first position P1.

On the other hand, the clutch housing 50 rotates at high speed in the winding direction (arrow A), with respect to the gear wheel 57, upon operation of the pretensioner 15, in a state where the engaging sections 41a of the pawls 41 and the inner teeth 50a of the clutch housing 50 are engaged, as illustrated in FIG. 4. Thereupon, the engaging sections 41a of the pawls 41 move away from the inner teeth 50a of the clutch housing 50, and the pawls 41 move, in the pawl sliding grooves 57c, from the openings 57d towards the far side (arrow B). At this time, the friction spring 42 rotates in the winding direction (arrow C) since the first bent sections 42b are guided by the holding recesses 41b of the pawls 41.

Figure 5:
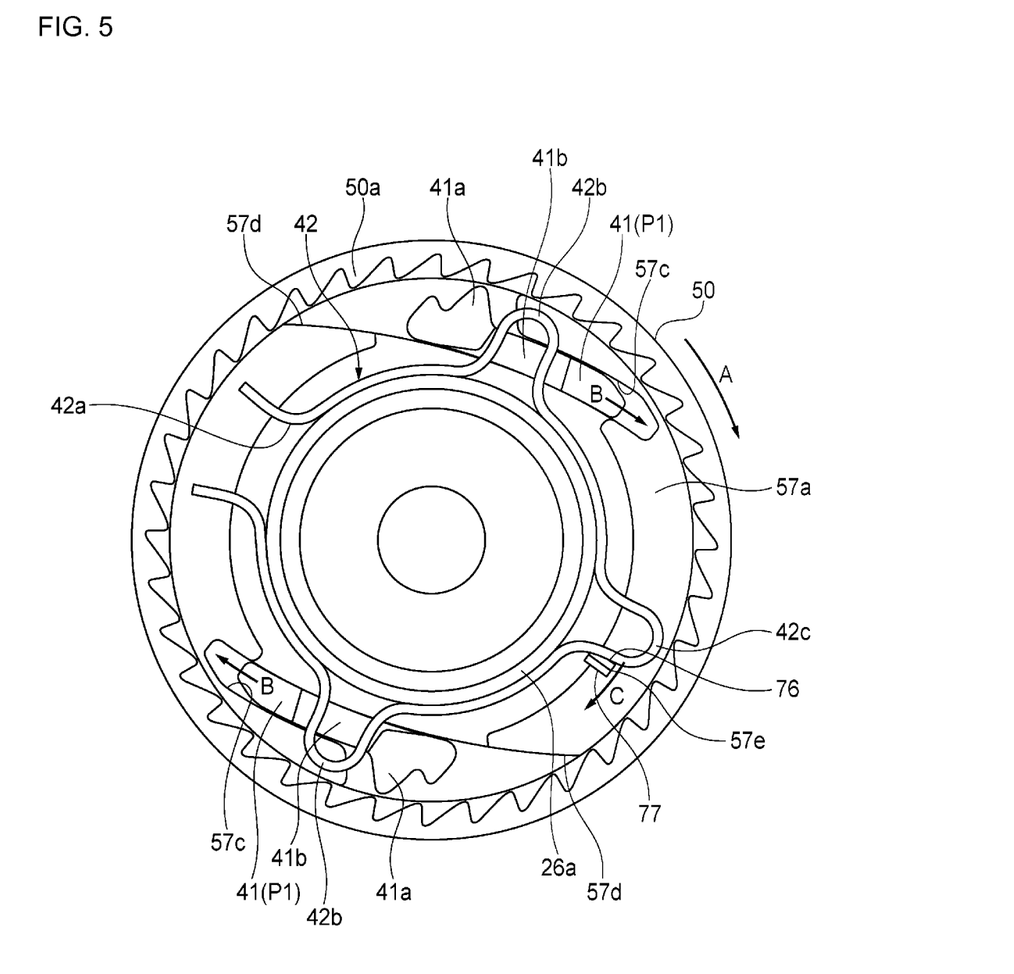
FIG. 5 is a diagram illustrating a state in which, from the state in FIG. 4, a pawl moves away from the clutch housing, through operation of a pretensioner.

As illustrated in FIG. 5, the second bent section 42c of the friction spring 42 abuts the inclined face 76 of the projection 57e of the gear wheel 57 (first position P1), and then climbs over the projection 57e along the inclined face 76 (third position P3), as illustrated in FIG. 6. At this time, movement of the pawls 41 in the pawl sliding grooves 57c is limited, further relative rotation of the friction spring 42 is restricted, and the gear wheel 57 and the friction spring 42 rotate integrally with each other. Thanks to the vertical face 77 on the opposite side of the inclined face 76 in the projection 57e, the second bent section 42c, having climbed over the projection 57e, cannot then recoil and return to the initial position (first and second positions P1, P2).

After operation of the pretensioner 15, as a result, the projection 57e limits the return of the second bent section 42c, even if the engaging sections 41a of the pawls 41 would change over again to an engaged state, and thus the pawls 41 remain supported by the friction spring 42. Therefore, the inner teeth 50a of the clutch housing 50 are prevented from meshing again with the engaging sections 41a of the pawls 41.

In the seat belt retractor 10 explained above, the clutch 61 has the clutch housing 50 that rotates with the spindle 12 and that has the inner teeth 50a, the pawls 41 having the engaging sections 41a that can engage with the inner teeth 50a, and the gear wheel 57 that is joined to the motor 34 and has the pawl sliding grooves 57c that hold the pawls 41 such that the pawls 41 move in the pawl sliding grooves 57c to a first position P1 at which the pawls 41 are positioned when the motor 34 is not operating, a second position P2 at which the pawls 41 become positioned when the engaging sections 41a engage with the inner teeth 50a of the clutch housing 50 through operation of the motor 34, and a third position P3 at which the pawls 41 become positioned on the opposite side to that of the second position P2 across the first position P1 upon operation of the pretensioner 15; and the return prevention mechanism that prevents the pawls 41 from returning to the first position P1 and the second position P2 after having moved to the third position P3. The return prevention mechanism comprises the annular friction spring 42 that, on account of a biasing force thereof, is held against the protrusion 26a of the outer gear cover 26, and against the holding recesses 41b that are provided in the pawls 41, and comprises the projection 57e that is provided in the gear wheel 57. The friction spring 42 climbs over the projection 57e when the pawls 41 move from the second position P2 to the third position P3 across the first position P1 through operation of the pretensioner 15. Therefore, reliable clutch operation can be achieved, with few parts, in that, after operation of the pretensioner 15, the engaging sections 41a of the pawls 41 do not engage again with the inner teeth 50a of the clutch housing 50.

The friction spring 42 has at least two or more bent sections (three, in the present embodiment) that are formed projecting in the radial direction. The first bent sections 42b are held in the holding recesses 41b that are provided in the pawls 41, in such a manner that the second bent section 42c climbs over the projection 57e that is provided in the gear wheel 57 when the pawls 41 move from the second position P2 to the third position P3 across the first position P1. A return prevention mechanism having a simple configuration is constructed thereby.

The pair of pawls 41 that engages with the inner teeth 50a of the clutch housing 50 is biased by the friction spring 42. A highly reliable return prevention mechanism is constructed thereby.

Figure 7:
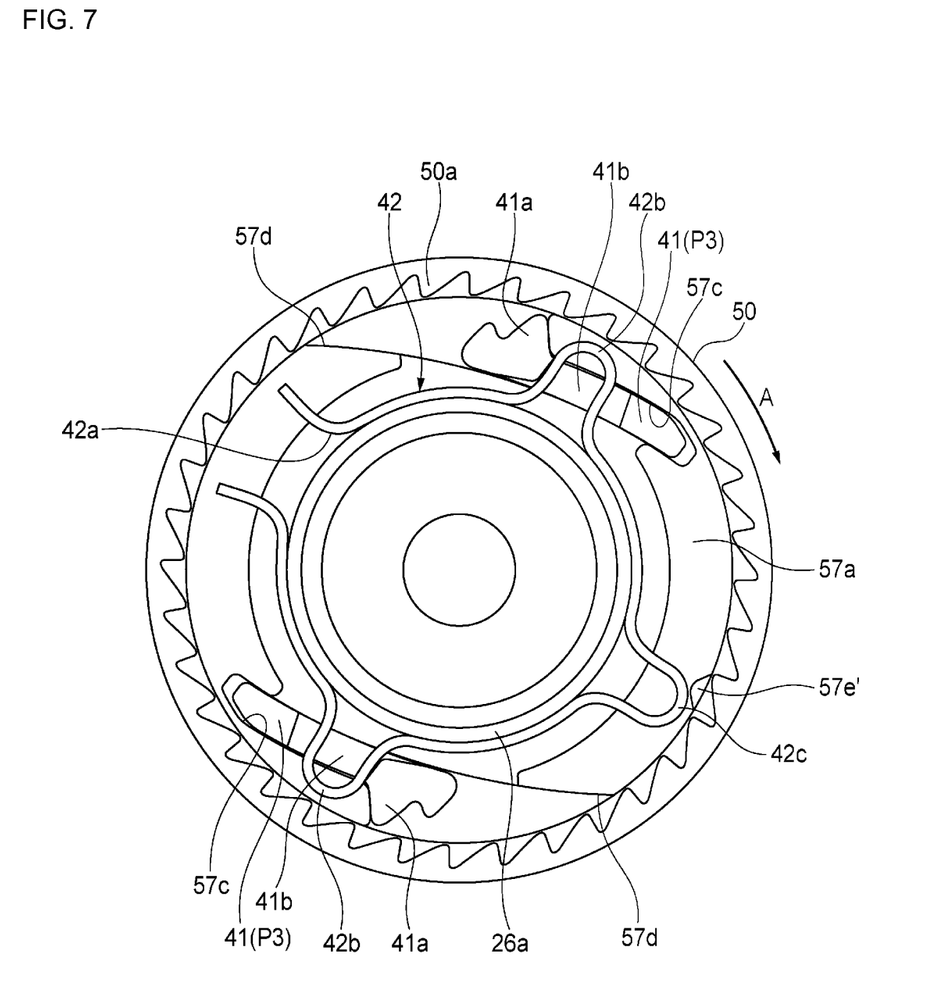
FIG. 7 is a diagram illustrating a state in which a bent section of a friction spring has climbed over a projection in a seat belt retractor of a second embodiment.

A seat belt retractor of a second embodiment of the present invention will be explained next with reference to FIG. 7. Except for the structure of the return prevention mechanism, the seat belt retractor of the second embodiment has the same configuration as the seat belt retractor 10 of the first embodiment. Constituent features identical to those of the first embodiment are denoted with identical reference numerals, and an explanation thereof will be omitted.

The friction spring 42 of the present embodiment has a configuration identical to that of the friction spring 42 of the first embodiment, i.e. is substantially ring-shaped and has an open section 42a at which both ends of the friction spring 42 are open, the pair of first bent sections 42b is held in respective holding recesses 41b of the pawls 41, and second bent section 42c is positioned so as to oppose the open section 42a, to make up the return prevention mechanism together with a projection 57e' of the gear wheel 57.

The projection 57e' of the gear wheel 57 is formed so as to project, from the outer edge section of the gear wheel 57 in the vicinity of the second bent section 42c, towards the inner diameter side, such that the friction spring 42 climbs over the projection 57e', through deflection of the second bent section 42c towards the inner diameter side, when the pawls 41 become positioned at the third position P3 through operation of the pretensioner 15. Once the second bent section 42c has climbed over the projection 57e' and has moved to the third position P3, the projection 57e prevents the second bent section 42c from returning thereafter to the first position P1 and the second position P2.

Figure 8:
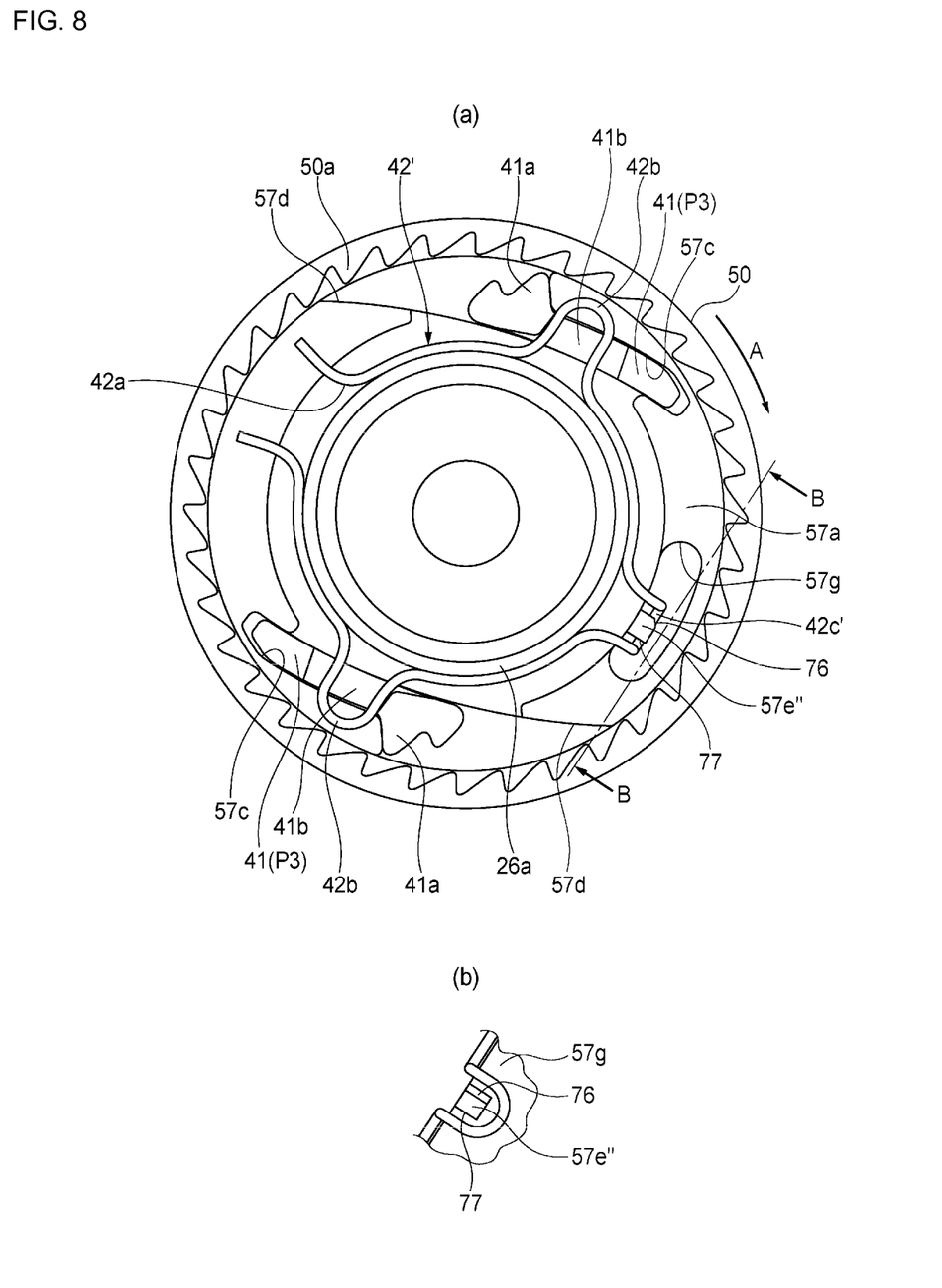
FIG. 8(a) is a diagram illustrating a state in which a bent section of a friction spring has climbed over a projection in a seat belt retractor of a third embodiment.
FIG. 8(b) is a view generally along line B-B in FIG. 8(a).

A seat belt retractor of a third embodiment of the present invention will be explained next with reference to FIG. 8. Except for the structure of the return prevention mechanism, the seat belt retractor of the third embodiment has the same configuration as the seat belt retractor 10 of the first embodiment. Constituent features identical to those of the first embodiment are denoted with identical reference numerals, and an explanation thereof will be omitted.

A friction spring 42' of the present embodiment is substantially ring-shaped and has the open section 42a at which both ends of the friction spring 42' are open, and the pair of first bent sections 42b is held in respective holding recesses 41b of the pawls 41. A second bent section 42c' is positioned opposing the open section 42a. The second bent section 42c' projects towards the outer diameter side, and then is bent so as to project towards the inner gear cover 27, along the axial direction. A trough-hole 57g, running through the axial direction, is formed in the gear wheel 57, in a movable region of the second bent section 42c'. A projection 57e'' that projects towards the outer diameter side is formed on the inner peripheral face of the trough-hole 57g. The projection 57e'' and the second bent section 42c' of the friction spring 42' make up a return prevention mechanism.

The projection 57e'' has an axial-direction length that is shorter than the axial-direction length of the second bent section 42c'. On the side against which the second bent section 42c' abuts there is formed the gentle inclined face 76 such that the second bent section 42c' can climb over the projection 57e'' upon operation of the pretensioner 15; on the side opposite to the side against which the second bent section 42c' abuts, there is formed the vertical face 77 that is perpendicular to inner peripheral face of the trough-hole 57g, in such a manner that the second bent section 42c' cannot return after having once climbed over the projection 57e''.

In the present embodiment, the trough-hole 57g that runs through in the axial direction, is provided in a movable region of the second bent section 42c' of the gear wheel 57, but the present embodiment is not limited thereto, and there may be formed a recess sunk in the axial direction.

In the return prevention mechanism configured as described above, the second bent section 42c' climbs over the projection 57e'' when the pawls 41 become positioned at the third position P3 upon operation of the pretensioner 15. Thus, once the second bent section 42c' climbs over the projection 57e" and moves to the third position P3, the second bent section 42c' is prevented thereafter, by the projection 57e", from returning to the first position P1 and the second position P2.

The seat belt retractor 10 in the above-described embodiments is a preferred example of the present invention, but may be embodied and implemented in other ways, in accordance with various methods. Unless specifically indicated in the description of the present application, the invention is not restricted by the shape, size, configurational arrangement and so forth of the detailed parts depicted in the drawings. The expressions and terms used in the description of the present application are explanatory in purpose, and are not meant to be limiting in any way, unless restricting subject matter to that effect is specifically set forth. In the above embodiments, for instance, the pair of pawls 41 is exemplified as an engaging member, but the embodiments are not limited thereto, and the pawls 41 may be provided as one pawl, such that one first bent section 42b and one second bent section 42c are provided in the friction spring 42.

The invention claimed is:

1. A seat belt retractor, comprising:
a spindle configured to wind a seat belt;
an electric actuator configured to cause the spindle to rotate;
a pyrotechnic pretensioner coupled to the spindle to retract the seat belt by acting on the spindle;
a power transmission mechanism that is configured to transmit power from the electric actuator to the spindle for rotating the spindle and that is configured to prevent power transmission from the electric actuator to the spindle upon operation of the pretensioner,
wherein the power transmission mechanism includes:
a first rotation member that rotates together with the spindle and has a first engaged section;
an engaging member having a second engaging section that can engage with the first engaged section of the first rotation member; and
a second rotation member that is joined to the electric actuator and has a groove section that holds the engaging member, such that the engaging member can move in the groove section between a first position at which the engaging member is positioned when the electric actuator is not operating, a second position at which the engaging member becomes positioned when the second engaging section engages with the first engaged section of the first rotation member through operation of the electric actuator, and a third position at which the engaging member becomes positioned on an opposite side to that of the second position across the first position upon operation of the pretensioner; and a return prevention mechanism that prevents the engaging member from returning to the first position and the second position after having moved to the third position, and
wherein the return prevention mechanism comprises an annular spring member that, on account of a biasing force thereof, is held against a fixed ring protruding from a cover member and against a recess that is provided in the engaging member; and a projection that is provided on the second rotation member, such that the spring member climbs over the projection and moves when the engaging member moves from the second position to the third position across the first position as a result of operation of the pretensioner.

2. The seat belt retractor according to claim 1, wherein the spring member has at least two bent sections that are formed projecting in a radial direction,
a first bent section from among the at least two bent sections is held in the recess that is formed in the engaging member, and
a second bent section from among the two or more bent sections climbs over the projection when the engaging member moves from the second position to the third position across the first position.

3. The seat belt retractor according to claim 2, wherein the projection is provided at an end face of the second rotation member to which the spring member is adjoining, and projects from the end face towards the spring member.

4. The seat belt retractor according to claim 2, wherein the projection is provided at an outer edge section of the second rotation member and projects from the outer edge section towards an inner diameter side.

5. The seat belt retractor according to claim 2,
wherein the second bent section includes a first portion projecting in the radial direction and a second portion thereafter projecting in an axial direction,
the second rotation member is provided with one of a through hole and a second recess that permits the second bent section to move accompanying motion of the engaging member, and
the projection is provided on an inner peripheral face of the one of the through hole and the second recess, and projects from the inner peripheral face towards an outer diameter side.

6. The seat belt retractor according to claim 1, wherein the projection is provided at an end face of the second rotation member to which the spring member is adjoining, and projects from the end face towards the spring member.

7. The seat belt retractor according to claim 1, wherein the projection is provided at an outer edge section of the second rotation member and projects from the outer edge section towards an inner diameter side.

* * * * *